United States Patent
Carrolo et al.

(10) Patent No.: US 12,319,009 B2
(45) Date of Patent: Jun. 3, 2025

(54) AUXILIARY TOOL

(71) Applicant: Aptiv Technologies Limited, St. Michael (BB)

(72) Inventors: Nuno José Lopes Carrolo, Lisbon (PT); Qiu Jianliang, Lisbon (PT); Pedro Matias, Lisbon (PT)

(73) Assignee: APTIV TECHNOLOGIES AG, Schaffhausen (CH)

( * ) Notice: Subject to any disclaimer, the term of this patent is extended or adjusted under 35 U.S.C. 154(b) by 94 days.

(21) Appl. No.: 18/144,402

(22) Filed: May 8, 2023

(65) Prior Publication Data

US 2023/0391019 A1 Dec. 7, 2023

(30) Foreign Application Priority Data

Jun. 1, 2022 (EP) .................................. 22176675

(51) Int. Cl.
*B29C 65/00* (2006.01)
*B29C 65/50* (2006.01)

(52) U.S. Cl.
CPC ...... *B29C 66/0322* (2013.01); *B29C 65/5092* (2013.01)

(58) Field of Classification Search
CPC ............ B29C 66/0322; B29C 65/5092; H01B 13/01263; B65H 35/06; B65B 13/04; B65B 13/18
See application file for complete search history.

(56) References Cited

U.S. PATENT DOCUMENTS

| 2013/0019565 | A1 | 1/2013 | Witkiewicz |
| 2018/0362060 | A1* | 12/2018 | Schaller .................. A61B 34/30 |
| 2022/0123534 | A1 | 4/2022 | Kwon |
| 2023/0339715 | A1* | 10/2023 | Schmelz .................. B65B 61/06 |

FOREIGN PATENT DOCUMENTS

| DE | 20 2008 004 087 U1 * | 6/2008 |
| DE | 20 2016 002 622 U1 * | 7/2016 |
| EP | 3503127 A1 * | 6/2019 |
| EP | 3716265 A1 | 9/2020 |

OTHER PUBLICATIONS

DE-20 2008 004 087-U1 Machine Translation of Description (Year: 2024).*
DE-20 2016 002 622-U1 Machine Translation of Description (Year: 2024).*
EP 3503127-A1 Machine Translation of Description (Year: 2024).*
Extended European Search Report for Application No. 22176675.1; mailed Nov. 8, 2022; 8 pages.

* cited by examiner

*Primary Examiner* — Cynthia L Schaller
(74) *Attorney, Agent, or Firm* — Billion & Armitage

(57) ABSTRACT

An auxiliary tool for fixing a free end of an adhesive tape wrapped around a strand comprises a base plate and a rotatable ring with a receptacle.

16 Claims, 3 Drawing Sheets

AUXILIARY TOOL

CROSS-REFERENCE TO RELATED APPLICATION

This application claims benefit of priority to European Patent Application No. 22176675.1 filed on Jun. 1, 2022, the entire disclosure of which is hereby incorporated by reference.

TECHNICAL FIELD OF THE INVENTION

The present disclosure relates to an auxiliary tool for fixing a free end of an adhesive tape wrapped around a strand.

BACKGROUND

Taping heads for taping a strand or a wire harness with a protective and/or adhesive tape are generally known. Such taping heads are used to manually or automatically wrap a tape around a bundle of wires. In industrial applications there is a need to automatically apply the tape to different wire harnesses or to different sections of a wire harness which requires that a tape which is supplied from a tape roll is cut and positioned.

When applying a tape to a strand, the process is initialized by adhering the free end of the tape on the strand, wrapping the tape around the branch and cutting the tape at a desired length. Thereafter, due to the cutting process a free end of the adhesive tape may not adhere to the strand. This (loose) free end is also called a flag.

A flag that is not closed (fixed on the strand) will require manual work and could result in quality issues.

Accordingly, there is a need to provide an auxiliary tool for fixing a free end of an adhesive tape that has been wrapped around a strand.

SUMMARY

The present disclosure provides an auxiliary tool for fixing a free end of an adhesive tape that has been wrapped around a strand. The tool includes a base plate with an aperture for receiving the wrapped strand and a rotatable ring with an aperture adapted to rotate about an axis extending through the center of the apertures. Further, a spring-loaded receptacle is provided for accommodating the strand. The receptacle is mounted to the rotatable ring. An opening of the receptacle can be aligned with the apertures for receiving the strand. If the ring is rotated, the receptacle is rotated about the strand by virtue of the ring being rotated. The auxiliary tool further has a coupling for connecting the auxiliary tool to a rotatable fixture or a manipulator such as a robot arm.

With the above auxiliary tool, the flag of an adhesive tape wrapped around a strand can be closed by rotating the receptacle around the strand such that also the free end of the tape adheres to the strand thereby closing the flag. The coupling allows for a connection of the auxiliary tool to a robot. Therefore, the auxiliary tool can be manipulated automatically after a taping head has completed the wrapping process and has been removed. Since the present disclosure provides a distinct tool for fixing the flag of an adhesive tape, it is not necessary to re-design automatic taping heads to provide the desired functionality which would raise the complexity and the overall volume of such taping head.

When positioning the auxiliary tool on a strand, the apertures of the rotatable ring and the base plate can be placed over the strand and the tool can be further fed against the strand without significantly deforming it. This allows for a good positioning of the strand in the center of the apertures and in the receptacle. When the auxiliary tool is further urged against the strand, the receptacle will move against a spring force. Thereby, a central axis of the strand can be aligned with the center of the apertures. Thereafter, the rotatable ring can be rotated, and the receptacle will be rotated around the strand thereby closing the flag.

According to an embodiment, the auxiliary tool may not include a tape roll, a cutting device or a tape roll holder. This means that such an auxiliary tool is exclusively dedicated for closing a flag and not for wrapping a tape around a strand.

According to a further embodiment, the receptacle may include a single continuous pressing surface. Such surface without any intermediate gaps or slits results in a smooth pressing of the flag against the strand when the rotatable ring is rotated.

According to a further embodiment, the pressing surface may be concavely curved and extend at least 90°, at least 120° or at least 180° about a center of curvature. The receptacle may have a generally semi-circular cross-section. Thereby, a strand is well received in the receptacle and a flag can be smoothly applied to the strand.

According to a further embodiment the receptacle is shiftably mounted on two parallel guide rods to achieve a smooth and linear movement of the receptacle when the auxiliary tool is pressed against the strand.

According to a further embodiment, the coupling of the auxiliary tool is configured as a simple adapter plate that can be mounted to a robot arm. According to a further embodiment, the coupling is configured as a quick mount coupling that allows a quick release of the auxiliary tool from the robot arm for maintenance or replacement.

According to a further embodiment the coupling may include a male and a female component and a locking element for interlocking the components, such as a screw, a bolt or the like.

According to a further embodiment, the coupling may include a first component that is shiftably inserted into a second component. In this embodiment both components may be interlocked by means of a form-lock. To fix or release the tool at or from the robot arm it is then merely necessary to apply or remove a locking element that interconnects both components.

According to a further embodiment, the first component may have a protrusion that is V-shaped in a top view and that has a dove-tailed cross-section. Such design provides a form-lock and a firm connection between the first and the second component. By means of the V-shape of the protrusion an alignment of both components is achieved when the protrusion is completely inserted in a complementary counterpart.

According to a further embodiment, the protrusion may have a curved circumferential wall. This is advantageous if the coupling has the general shape of a disc.

According to a further aspect of the present disclosure, a system is provided that includes an auxiliary tool as disclosed above and a taping head, both mounted to a rotatable fixture that has an axis of rotation. A longitudinal axis of the taping head and a longitudinal axis of the auxiliary tool are oriented at the same angle with regard to the axis of rotation. When such system is mounted to a robot arm, the taping head on the one hand and the auxiliary tool on the other hand can be brought in an operating position by merely turning the rotatable fixture. Thereby, a fast change of the tools can be provided.

According to a further embodiment, the longitudinal axis of the taping head and the longitudinal axis of the auxiliary tool are oriented at an angle of 120° as seen along the axis of rotation of the rotatable fixture. This serves to reduce the time required for changing the fools.

BRIEF DESCRIPTION OF THE DRAWINGS

The present invention is now described, by way of example with reference to the accompanying drawings, in which.

DETAILED DESCRIPTION

Figure 6:
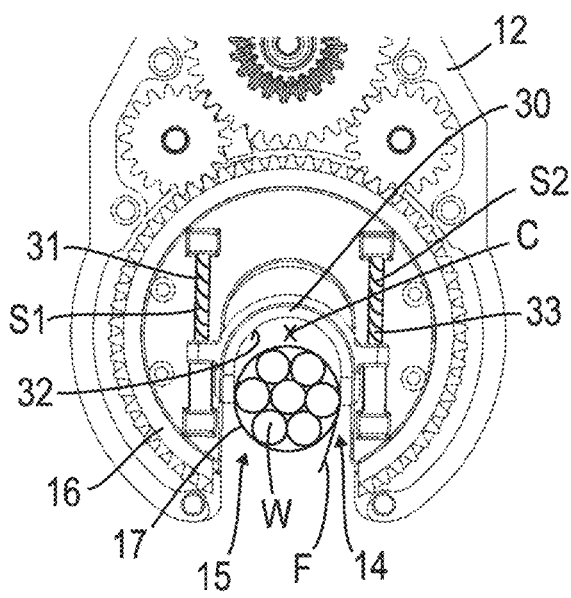
FIG. 6 is a plan view of the auxiliary tool of FIG. 5 according to some embodiments of the present disclosure.

FIGS. 1 to 4 depict an auxiliary tool 10 for fixing a free end F of an adhesive tape 17 (see FIGS. 6 and 7) to a strand W. e.g., a wire harness, according to an embodiment of the present disclosure. The auxiliary tool 10 includes a base plate 12 with an aperture 14 for receiving the wire harness W. The aperture 14 has the shape of a broad slit which extends to an outer edge of the base plate 12 along a longitudinal axis A3 (see FIG. 1) with a dead end of the slit having a semi-circular shape. A rotatable ring 16 is adapted to rotate about a center C (see FIG. 6) of the aperture 14. The rotatable ring 16, which also includes a aperture 15 having the shape of the aperture 14 of the base plate 12, is rotated around the center C by means of a motor 11 (see FIG. 4) that rotates a beveled drive gear 40 that meshes with further gears 42, 44 and 46 to rotate the rotatable ring 16 that has a teethed outer circumference.

For supporting and accommodating the strand W in the apertures 14 and 15, a one-piece and spring-loaded receptacle 30 may be provided having an opening at its circumference for receiving the strand W. The opening of the receptacle 30 is aligned with the aperture 15 in the rotatable ring 16. The receptacle 30 can be linearly shifted along respective rods 31 and 33 mounted on the rotatable ring 16 adjacent two opposing sides of the aperture 15. The rods 31 and 33 are arranged in parallel to each other and the receptacle 30 is spring-loaded by means of two springs S1 and S2 surrounding the rods 31 and 33. Accordingly, if the auxiliary tool 10 is positioned over the wire harness W (see FIG. 6) and urged against the wire harness (see FIG. 7), the receptacle 30 will be pushed against the force of the springs S1 and S2 until the center of the wire harness W is located at the center C of the apertures 14 and 15.

Figure 5:
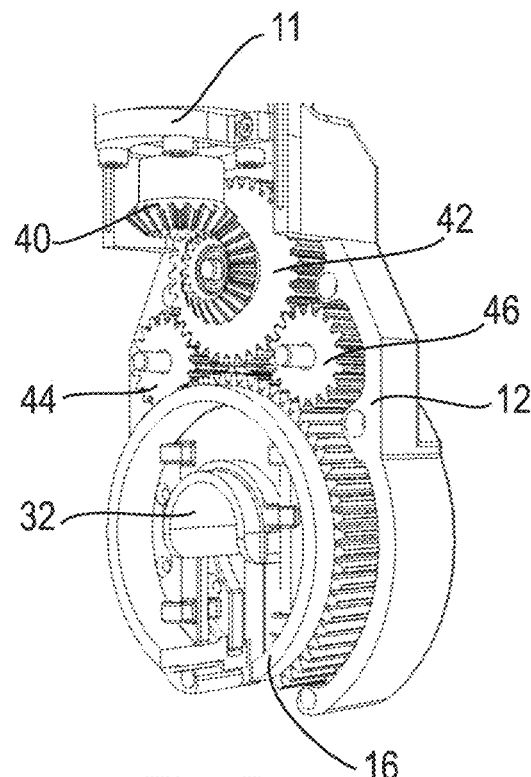
FIG. 5 is an enlarged illustration of the auxiliary tool of FIG. 4 according to some embodiments of the present disclosure.

As shown in the drawings, the receptacle 30 includes a single and continuous pressing surface 32 having no gaps or slits. In the disclosed embodiment the pressing surface 32 is concavely curved and has a generally semi-circular cross-section. Accordingly, the pressing surface 32 extends generally 180° about its center of curvature. FIG. 5 shows that the corners of the receptacle 30 are rounded such that the receptacle 30 will not damage the tape already wrapped around the harness W.

Figure 8:
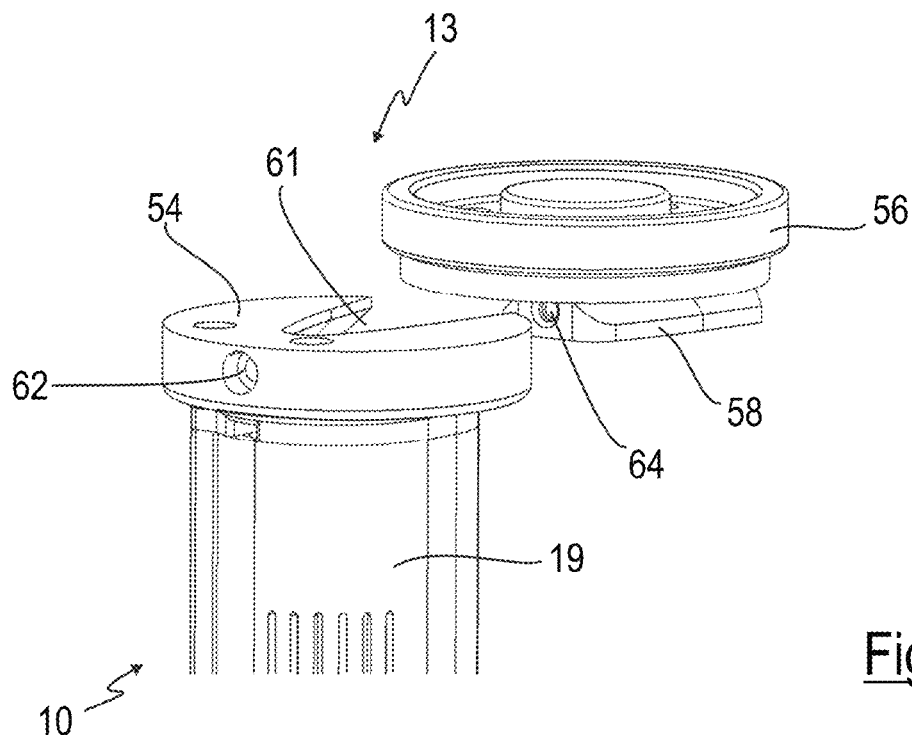
FIG. 8 is an isometric view of two components of a coupling according to some embodiments of the present disclosure.
Figure 9:
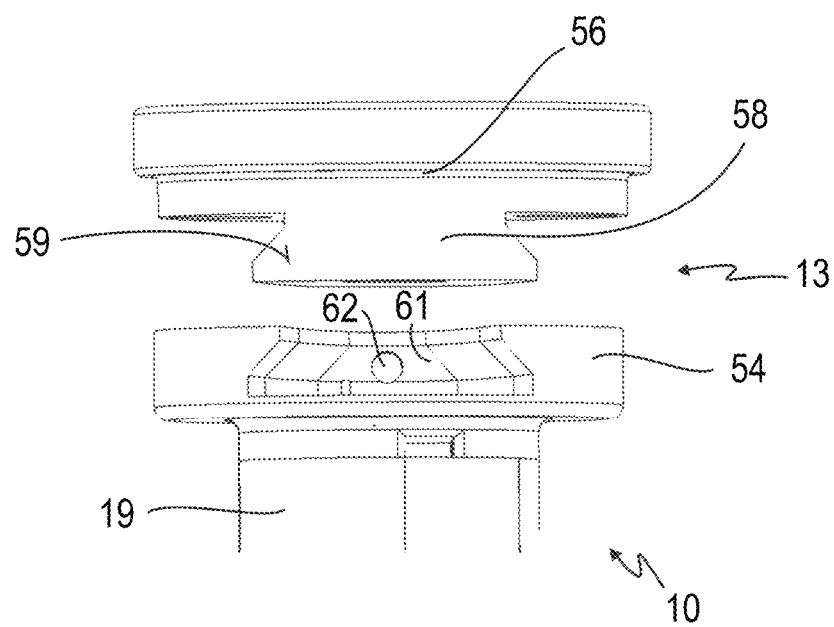
FIG. 9 is a side view of the coupling of FIG. 8 according to some embodiments of the present disclosure.

For mounting the auxiliary tool 10 to a manipulator, such as a robot 52 (see FIG. 1), the auxiliary tool 10 is provided at its upper end with a coupling 13 that may be generally disc-shaped and that is shown in more detail in FIGS. 8 and 9. The coupling of the disclosed embodiment is configured as a quick-mount coupling and includes a male component 56 and a female component 54 that are generally disc-shaped and have a similar diameter. The female component 54 is fixed to the auxiliary tool 10 by means of screws or bolts and the male component 56 of the coupling 13 can be fixed to the robot 52 (see FIG. 1) or a rotatable fixture 50 by means of screws or bolts.

For connecting both components 54 and 56 the male component 56 includes a protrusion 58 that is V-shaped in a top view and that has a dove-tailed cross-section (see FIG. 9). An outer circumferential wall 59 of the protrusion 58 is curved and the protrusion 58 can be slidably inserted into a complementary receiving groove 61 in the female component 54.

When the protrusion 58 of the male component 56 is completely inserted into the groove 61 of the female component 54, a fixing screw (not shown) can be inserted into a radial bore 62 in the female component 54 and can be screwed into a thread 64 (see FIG. 8) in the protrusion 58 of the male component 56. When both components 54 and 56 are interconnected in this way, the coupling 13 has a general outer contour of a disc (see FIGS. 2 to 4).

Figure 1:
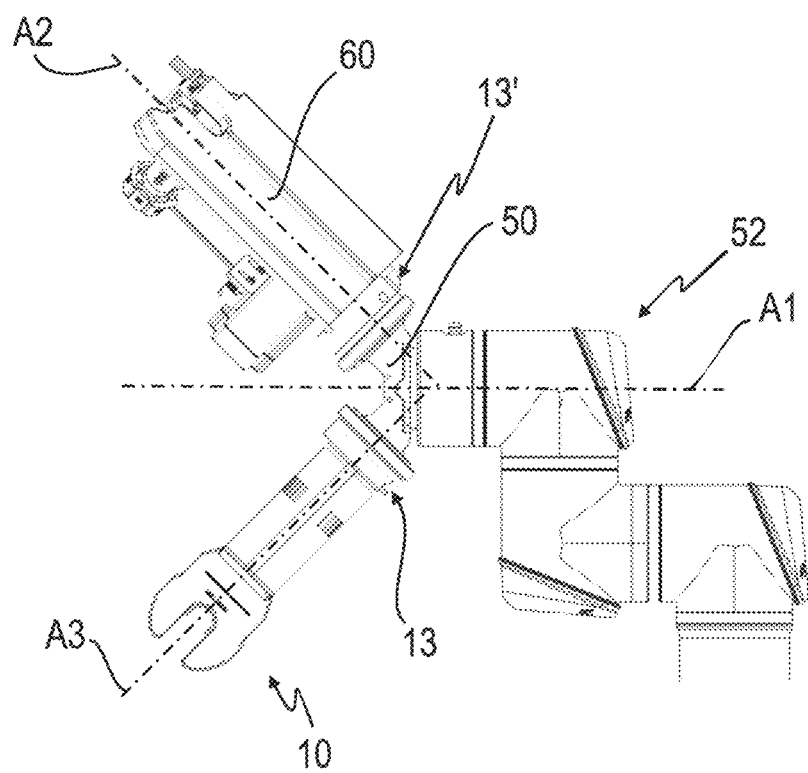
FIG. 1 is a side view of a system having an auxiliary tool and a taping head mounted to a rotatable fixture, according to some embodiments of the present disclosure.
Figure 2:
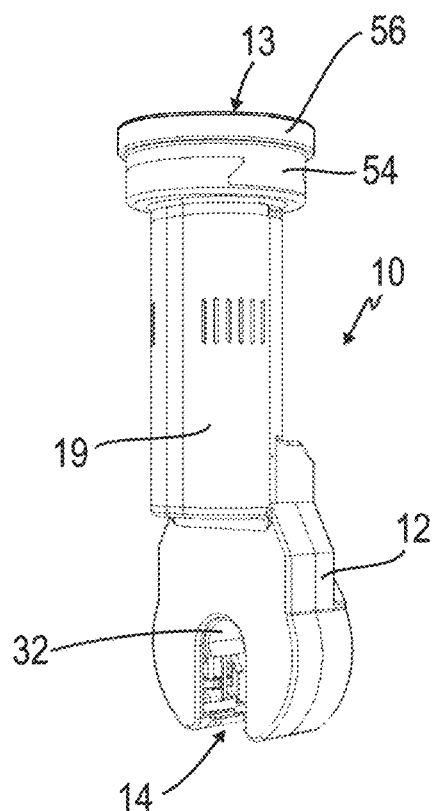
FIG. 2 and FIG. 3 are isometric views of an auxiliary tool according to some embodiments of the present disclosure.
Figure 3:
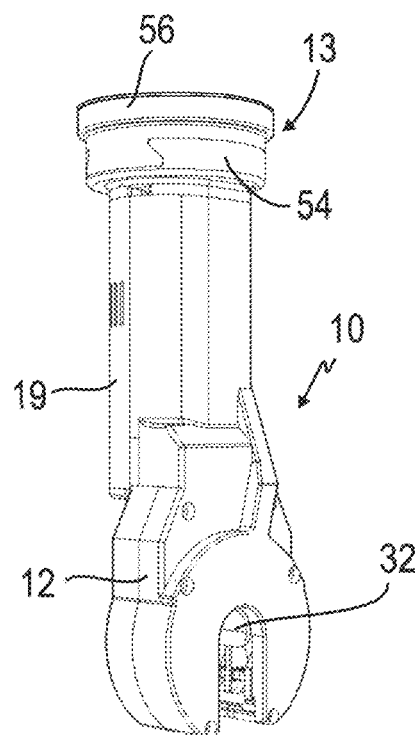
Figure 4:
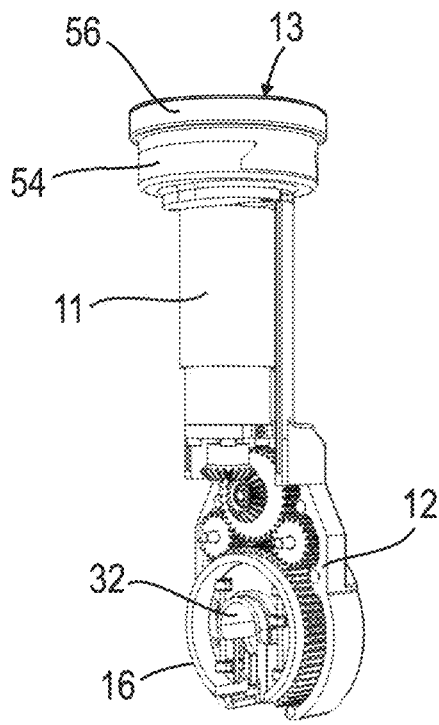
FIG. 4 is a perspective view of the auxiliary tool FIG. 2 with a housing of the auxiliary tool being opened according to some embodiments of the present disclosure.

FIG. 1 depicts a system that includes the auxiliary tool 10 mounted to the rotatable fixture 50 having an axis of rotation A1 by means of the coupling 13. Further, a taping head 60) is mounted to the rotatable fixture 50. A longitudinal axis A2 of the taping head 60 and a longitudinal axis A3 of the auxiliary tool 10 may be oriented at the same angle with regard to the axis of rotation A1. As seen along the axis of rotation A1, the longitudinal axis A2 of the taping head 60) and the longitudinal axis A3 of the auxiliary tool 10 may be oriented at an angle of 120°. Advantageously, a coupling 13' that connects the taping head 60 with the rotatable fixture 50 may be similar or identical to the coupling 13 described above. In the embodiment of FIG. 1, the auxiliary tool 10 and the taping head 60 are mounted to the rotatable fixture 50 via the couplings 13 and 13', and the rotatable fixture 50 is configured to be rotated by the robot 52.

After an adhesive tape 17 has been wrapped around the harness W by means of the taping head 60), the rotatable fixture 50 will be rotated e.g., about 120° around the axis A1. This has the effect that the apertures 14 and 15 of the auxiliary tool 10 will move to the previous position of the taping head 60. The robot 52 will then move the auxiliary tool 10 towards the harness W to place the apertures 14 and 15 over the harness W or in other words to introduce the harness W into the apertures 14 and 15 (see FIG. 6). At a certain point in time the wire harness W wrapped with tape 17 but leaving a flag F will contact the receptacle 30. The movement of the auxiliary tool 10 is continued until the centers of the apertures 14 and 15 coincide with the center of the wire harness (see FIG. 7).

Figure 7:
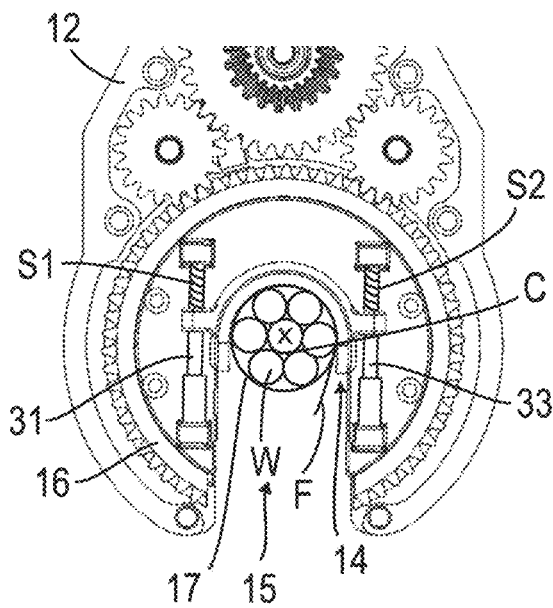
FIG. 7 is an illustration of the auxiliary tool of FIG. 6 with a strand being received in the receptacle according to some embodiments of the present disclosure.

Thereafter, the motor 11 will be activated to rotate the gears 40-46 in order to rotate the rotatable ring 16 (in FIG. 7 in a clockwise direction). As a result, the flag F is pressed against the wire harness W by means of the rotating receptacle 30. Thereby, the flag is closed and the auxiliary tool 10 may be removed from the wire harness.

As shown in the drawings, the disclosed embodiment of an auxiliary tool 10 is compact and has a generally cylindrical shape. The elements of the auxiliary tool 10 are accommodated in the housing having an openable lid 19.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes", "including", "includes", and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. An auxiliary tool configured to fix a free end of an adhesive tape wrapped around a strand, the tool comprising:
    a base plate with an aperture for receiving the wrapped strand,
    a rotatable ring with an aperture adapted to rotate about an axis extending through a center of the apertures, and
    a spring-loaded receptacle for accommodating the strand, wherein the receptacle is mounted to the rotatable ring and comprises a single continuous pressing surface, and
    a coupling for connecting the tool to a rotatable fixture.

2. The auxiliary tool according to claim 1, wherein the auxiliary tool does not include a tape roll nor a cutting device.

3. The auxiliary tool according to claim 1, wherein the pressing surface is concave and extends at least 90° about a center of curvature.

4. The auxiliary tool according to claim 3, wherein the pressing surface extends at least 120° about a center of curvature.

5. The auxiliary tool according to claim 4, wherein the pressing surface extends at least 180° about a center of curvature.

6. The auxiliary tool according to claim 1, wherein the receptacle has a generally semi-circular cross-section.

7. The auxiliary tool according to claim 1, wherein the receptacle is shiftably mounted on two parallel guide rods.

8. The auxiliary tool according to claim 1, wherein the coupling is configured as a quick mount coupling.

9. The auxiliary tool according to claim 1, wherein the coupling comprises a male component, a female component, and a locking element configured to interlock the male and female components.

10. The auxiliary tool according to claim 1, wherein the coupling comprises a first component that is shiftably inserted into a second component.

11. The auxiliary tool according to claim 10, wherein the first component has a V-shaped protrusion having a dovetailed cross-section.

12. The auxiliary tool according to claim 11, wherein the protrusion has a curved circumferential wall.

13. A system comprising:
    an auxiliary tool configured to fix a free end of an adhesive tape wrapped around a strand, the auxiliary tool comprising:
        a base plate with an aperture for receiving the wrapped strand,
        a rotatable ring with an aperture adapted to rotate about an axis extending through a center of the apertures,
        a spring-loaded receptacle for accommodating the strand, wherein the receptacle is mounted to the rotatable ring, and
        a coupling for connecting the tool to a rotatable fixture; and
    a taping head, wherein the auxiliary tool and the taping head are mounted to a rotatable fixture having an axis of rotation and wherein a longitudinal axis of the taping head and a longitudinal axis of the auxiliary tool are oriented at the same angle with regard to the axis of rotation.

14. The system according to claim 13, the longitudinal axis of the taping head and the longitudinal axis of the auxiliary tool are oriented at an angle of 120° relative to the axis of rotation.

15. The system according to claim 13, wherein the taping head is provided with a coupling that is configured as a quick mount coupling.

16. The system according to claim 13, wherein the auxiliary tool is provided with a coupling that is configured as a quick mount coupling.

* * * * *